Patented Oct. 13, 1936

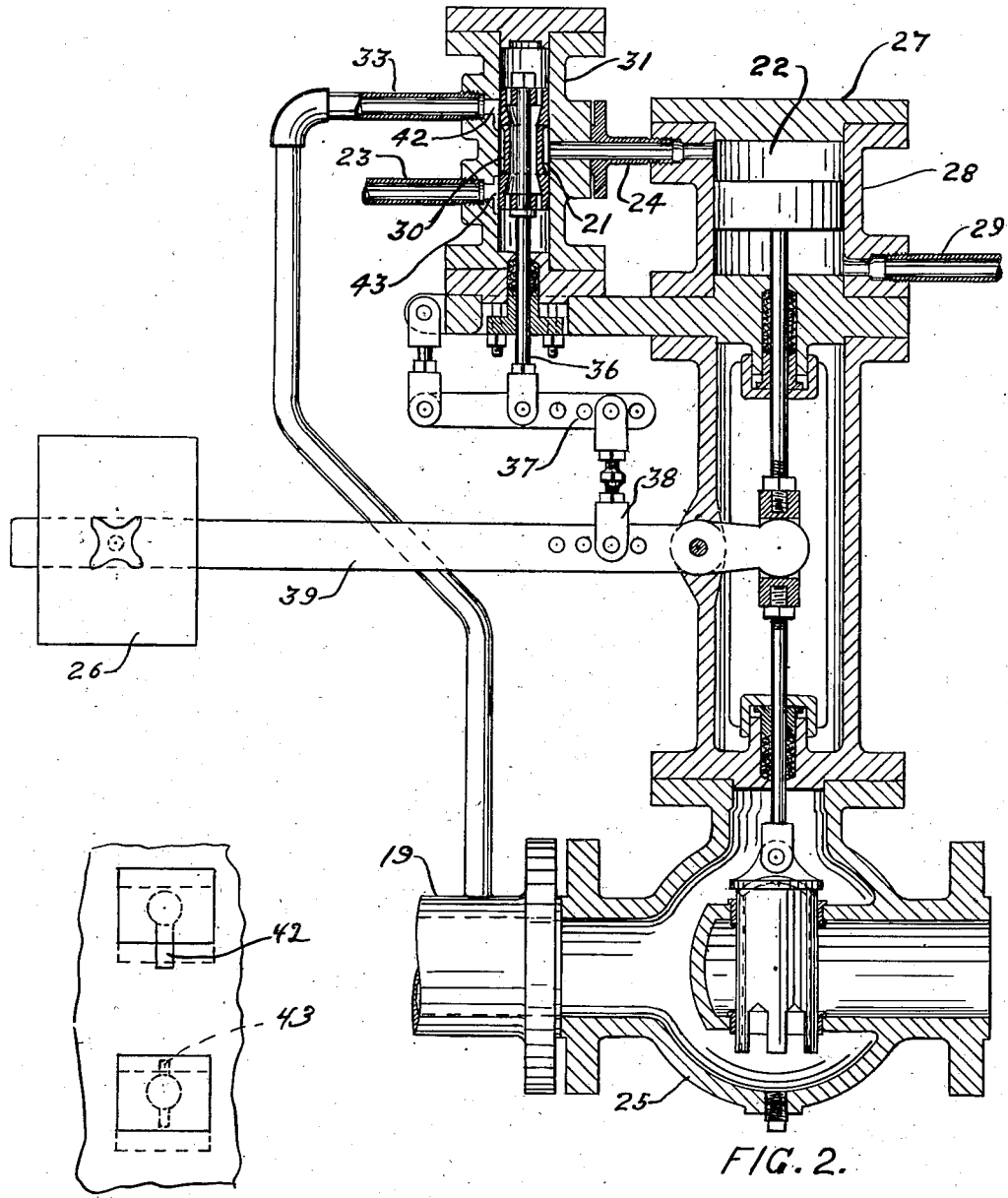

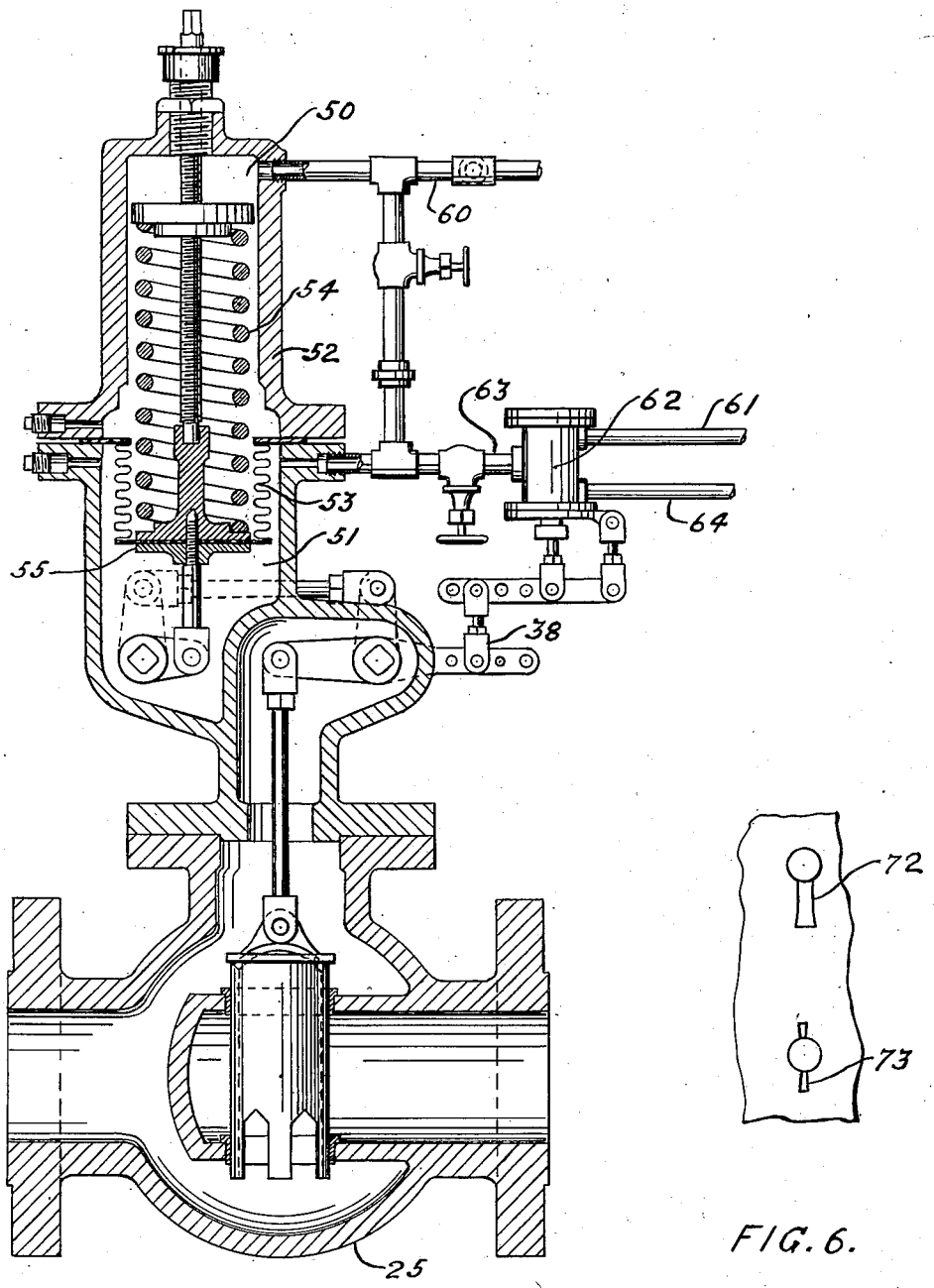

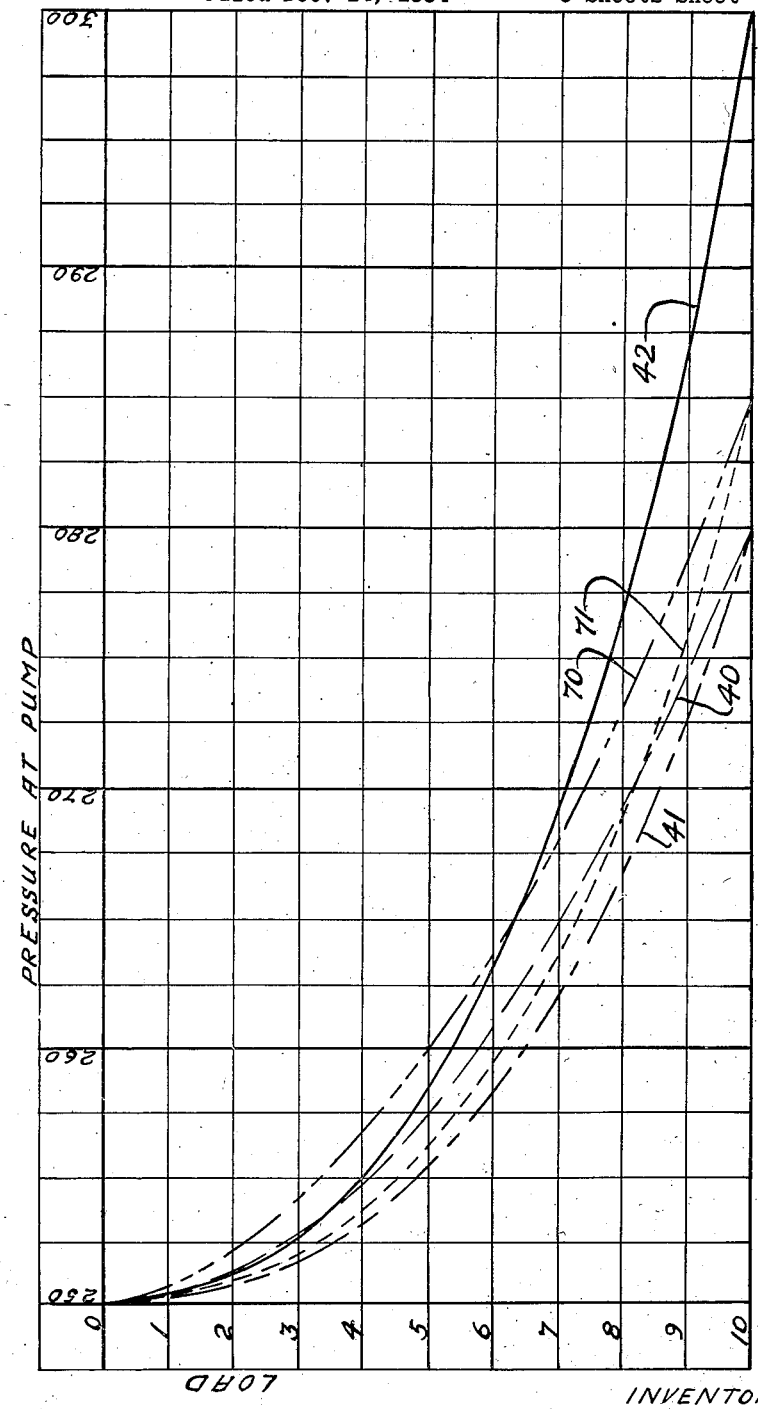

2,057,172

UNITED STATES PATENT OFFICE 2,057,172

FEED WATER REGULATOR SYSTEM

Vincent V. Veenschoten, Erie, Pa., assignor to Northern Equipment Company, a corporation of Pennsylvania Application December 14, 1934, Serial No. 757,532

20 Claims. (Cl. 122—451.2)

This invention relates to feed water regulator systems, and particularly to such systems for use with steam boilers and the like. One object of the invention is to more suitably control the flow of water to the boiler or other apparatus in accordance with the needs thereof. With boilers operating at high steam pressures, or at higher capacities than the normal rating, and particularly with boilers consuming large quantities of water, sometimes as much as several tons a minute, it is very desirable to have means for feeding the water as nearly as possible according to the needs in view of the particular conditions of operation.

Also, because of the changing conditions under which a boiler may be operated, either temporarily or more or less permanently, it is desirable to have simple means for adjusting the feeding mechanism according to the changed conditions or requirements. Under some conditions it is desirable to vary the water level elevation in the boiler inversely proportionally with the load; other times it is desirable to carry a substantially constant water level in the boiler; and at other times or in other boiler systems it may be desired to vary the water level directly with the load on the boiler.

My invention cares for all of these conditions, and provides means for conveniently changing from one method of operation to another without interfering with the apparatus or even with the operation of the boiler.

In some cases, in the event of material changes in load on the boiler, and consequent material changes of pressure of the steam therein, there is danger of temporarily flooding the boiler or of reducing the water level elevation therein to a dangerous point. My invention provides means for eliminating these hazards, and it is particularly applicable to cases where the method of feeding water is such as to vary the water level elevation directly as the load varies, as in such cases the hazard of flooding or emptying the boiler is greater.

Other objects of the invention will be apparent from a consideration of the accompanying drawings and the following description thereof.

Figure 1:
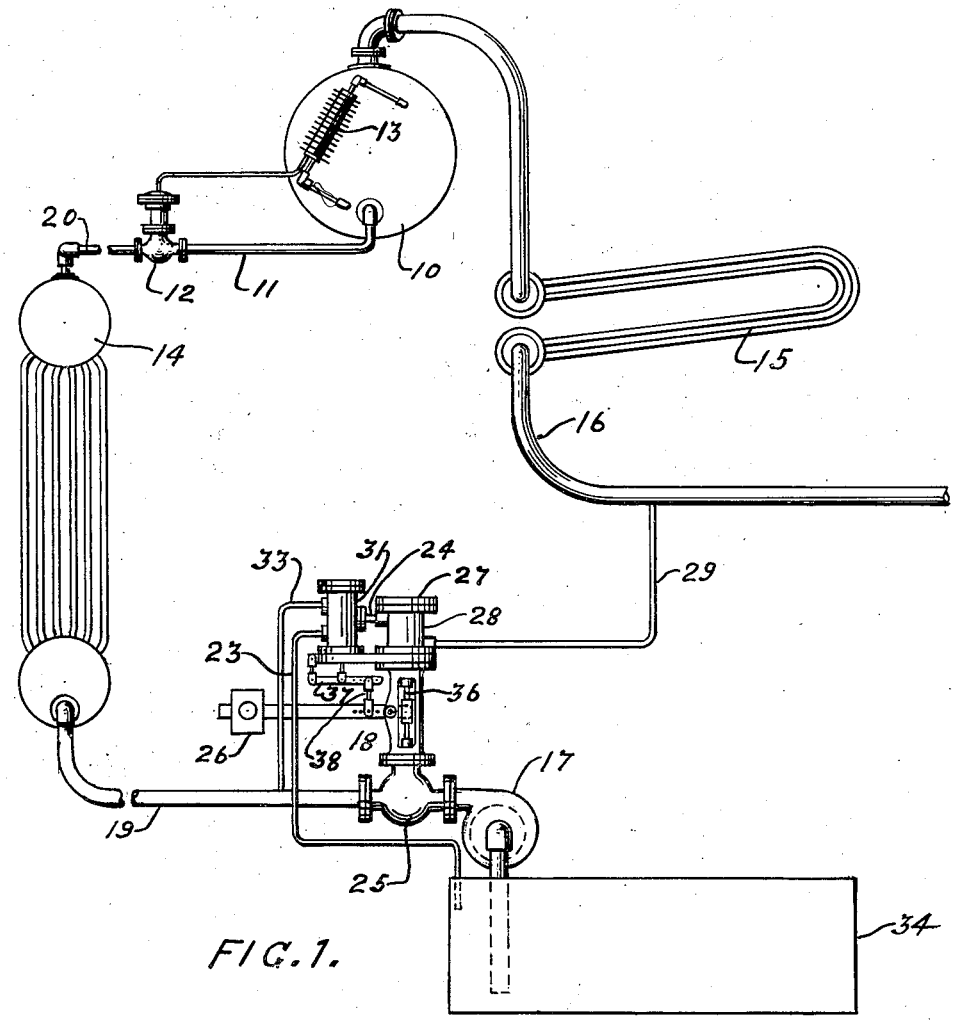
Figure 7:
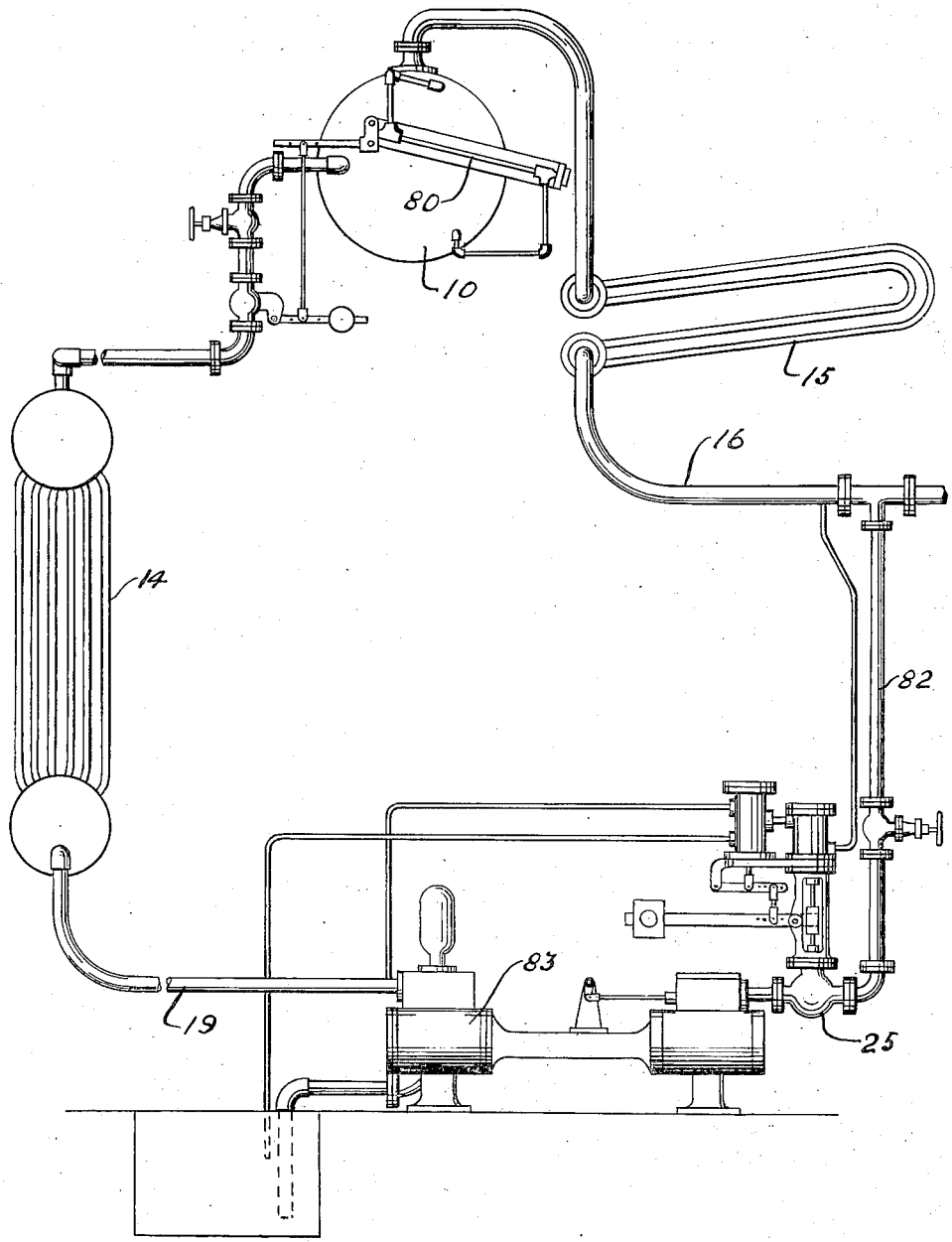

Of the drawings, Fig. 1 is an elevation, more or less diagrammatic of a boiler system which embodies the features of my invention; Fig. 2 is an enlarged central sectional view of my valve mechanism for carrying out the objects of my invention; Fig. 3 is a diagrammatic view of two valve ports of the mechanism; Fig. 4 is an enlarged central sectional view of modified mechanism for the purpose; Fig. 5 illustrates certain curves relating to the system; Fig. 6 shows modified valve ports; and Fig. 7 is an elevation of a boiler system embodying my invention, but including certain elements and modifications not shown in Fig. 1.

In Fig. 1, I have shown, for the purpose of illustrating my invention, an ordinary type of boiler system, in which the boiler 10 is supplied with water through a pipe 11, by means of a feed water valve 12. The valve may be operated by any suitable type of regulator, such as the generator regulator 13 which, in an ordinary manner, is responsive to the changes in water level elevation in the boiler. Associated with the boiler in this instance is an economizer 14 and a superheater 15, and also a steam main 16. Water under pressure is supplied to the water pipe 19 by any suitable means, such as the centrifugal pump 17 which may be operated in any suitable manner.

The means which I provide for accomplishing the objects of the invention comprises the mechanism 18. In this instance I have shown this mechanism connected in the water pipe of the system for controlling the water pressure therein; but it is to be understood that this mechanism could be inserted in the steam pipe which provides steam for operating the pump, if so desired, thereby controlling the speed of the pump and thus the water pressure in the water pipe. In either case the mechanism is adapted to very sensitively control the water pressure passing to the pipe 19 and thus passing to the feed water valve 12, in accordance with the needs of the boiler.

As is well understood, when the feed water valve of a boiler system opens more, there is a drop in pressure in the water pipe, so that the flow of water is not proportional to the valve opening. Because of this it is common to provide means for maintaining constant the drop in water pressure through the valve, so that this drop is uniform for all water flows. This, however, does not affect materially the drop in water pressure through the pipe 20 and through the economizer and the pipe 19, and, hence, the drop in pressure at the inlet of the feed water valve or of the control valve associated therewith. As a consequence the flow through the feed water valve is not proportional to the valve opening, and there is a material lowering of the water in boiler as the high load comes on, and a material raising with low loads. In many cases this is objectionable, and the mechanism 18 is adapted to eliminate these disadvantages.

This mechanism comprises a valve, which may be the ordinary valve in the steam line to the pump, or it may be, as in Fig. 1, a valve 25 adjacent the pump in the water line. The opening of this valve is controlled by a weight 26 and a motor 27. The lower end of the cylinder 28 of the motor is connected by a pipe 29 with the steam main 16, and the upper end of the cylinder is normally in communication with the water pipe 19. This in general is the arrangement of a common form of governor valve for the pump, and the valve 25 in general is operated similarly, as follows:

As the flow of water in the boiler increases, the pressure in the pipe 19 will sink, and the weight 26 and the steam pressure will open further the valve 25 and raise the pressure in the pipe 19 to normal. This, however, does not take care of the drop in water pressure from the pump or the valve 25 through the pipe 19 the economizer 14 and the valve 12, and hence the flow to the boiler is not increased proportionally with the opening of the valve 12.

To take care of this, I provide means for increasing the pressure at the outlet of the valve 25 as the water flow therefrom increases. These means comprise what I prefer to call a bleed valve 30 mounted in the casing 31. In general this valve is similar to a pilot valve, but its purpose is to allow some leakage from the chamber 21 so as to reduce the water pressure in the chamber 22 below the pressure in the pipe 19. This allows the valve 25 to open further than otherwise, and thus raises the pressure in the pipe accordingly.

This bleed valve 30 is mounted in the cylinder 31, of which the upper end is connected by a pipe 33 with the water pipe 19, and the lower end is connected by a pipe 23 with a storage tank 34, or elsewhere, so that substantially atmospheric pressure is effective in that pipe. The valve 30 is connected by a rod 36, a lever 37, and a link 38 with the lever 39 carrying the weight 26. The central portion of the cylinder 31 is connected with the upper end of the cylinder 28 by a pipe 24.

In the position indicated by Fig. 2, the main valve 25 is nearly closed and the port 42 to the pipe 33 is open and the port 43 to the pipe 23 is closed, or nearly so, so that the motor is controlled by substantially the full pressure in the pipe 19. But, as the water level in the boiler sinks, and the feed valve opens more, the pressure in the pipe 19 and the water chamber 22 sinks, and the valve 25 is opened more. As the weight sinks the pilot valve will be drawn down, closing somewhat more the port 42 and opening somewhat the port 43 to the pipe 23, and thus bleeding water from the chamber 21. This will reduce still further the pressure in the chamber 22, and will allow the valve 25 to open still further, thus increasing the water pressure in the pipe 19.

This increase in the water pressure in the pipe 19 will extend to the chamber 22 until the pressure therein is sufficient to stop the action of the motor, or even to reverse its action somewhat. While the load remains heavy there will be continuous bleeding from the chamber 21; but when the load drops sufficiently the port 42 will be opened more and the port 43 to the atmosphere closed, or nearly so, and the operation will become normal.

Evidently the magnitude of this bleeding effect will depend on various factors, such as the amount of opening and closing of the ports. This will depend upon the shape of the two ports 42 and 43, and also upon the amount of movement of the pilot valve with reference to the movement of the main valve 25.

By eliminating the bleeding entirely, the ordinary effect will result, and the water level elevation will vary somewhat materially inversely with the load variations; by introducing some bleeding this variation in level will be diminished; by increasing the bleeding still more, the level may be maintained substantially constant; and more bleeding will vary the level directly with the load to any desired amount. In all of these cases the bleed port 43 should be closed with light loads and the pressure port 42 should be wide open. The pressure port should be more or less open at all loads, as otherwise the control valve 25 would remain open.

On the other hand, if it should be desired to increase the water level variations inversely with the load changes more than with the ordinary governor without bleeding, it is necessary only to have the bleed valve less and less effective as the governor valve 25 opens more and more. There should be substantially no bleeding with heavy loads and maximum bleeding with light loads. This may be accomplished by reversing the pipe connections to the pilot valve, or by reversing the movement of the pilot valve with reference to the movement of the main valve, and properly forming the ports and positioning the pilot valve.

It will be understood that the water level range in the boiler may be adjusted higher or lower by adjusting the position of the feed water valve plunger with reference to the water level regulator. With the bleed valve the level range in the boiler may be adjusted by adjusting the level when there is no bleeding, or the minimum bleeding, and then the magnitude of the level range will vary substantially with the amount of bleeding.

All of this is based upon producing at the inlet or the outlet of the feed water valve 12 a pressure unlike that ordinarily produced with the ordinary governor. If it is desired to have the boiler level nearly constant or vary somewhat with the load the valve pressure should be maintained nearly constant; as a result the flow is substantially proportional to the feed valve opening.

In case it is desired to maintain a substantially constant pressure at the feed water valve 12, the pressure at the governor valve 25 must vary substantially as the square of the water flow, as the pressure loss by friction is substantially as the quare of the flow. Fig. 5 illustrates, by a parabolic curve 40, this friction loss. In this case the pressure at the feed valve is taken as 250 pounds at no load, and the friction loss curve shows a loss in pressure at the valve of 30 pounds at a load of 10 units. Hence, to maintain 250 pounds at the feed water valve the governor valve must deliver 280 pounds of pressure at the load of 10 units. With a constant pressure governor of the ordinary type the drop at the feed valve would be to 220 pounds; but with the bleed valve the pressure delivered by the governor will depend upon the shape and size of the pilot valve ports and upon the relative ratio of movement of the pilot valve and the governor valve.

Fig. 3 shows in general the preferred form of the pilot valve ports 42 and 43, and by the dotted lines the approximate positions of the pilot valves are indicated for the minimum and maximum openings of the valve 25. With ports of this shape the pressure therethrough is substantially inversely proportional to the square of the areas, or to the square of the valve movement or lift. The valve ratio of movement will depend upon the governor valve rate of movement and the lever connections between the two valves. It can be shown mathematically that, with a ratio of movement of the pilot valve to that of the main valve of about .257 to 1 the varying pressures delivered by the governor would be substantially as indicated by the curve 41. This curve follows fairly closely the pressure loss curve 40, sufficiently close for most purposes in practice.

If the ratio of the valve movements is .31 to 1, curve 42 will follow. This arrangement would increase the pressure at the inlet of the water feed valve at a rate greater than the loss by friction, so that it would not require as much change in the water level with increasing loads; and the pressure might be even high enough to require a rising water level with increasing loads to give the proper opening of the feed water valve.

All of this is based upon the effects of variations in boiler water level alone, either temporary oscillations or variations owing to changes in loads on the boiler. The governor, however, is affected by changes in steam pressure, just as is the case with ordinary governors. In case of material changes in steam pressure the opening of the valve 25 is materially affected. If the load changes, the steam pressure usually changes, and the pressure in the governor motor will change accordingly.

In case of a material increase in boiler load, the pressure of steam will drop and the governor valve will close more. This is desirable, as at times in such cases the greater generation of steam in the boiler, and the greater expansion of the steam in the water, forces up the water level and tends to flood the boiler. Also, as the governor closes more the water pressure in the water chamber 22 of the motor increases and closes still more the valve 25, and this effect is increased by the decreased bleeding as the valve closes. Hence danger of flooding is decreased by the bleed valve.

Similarly, in case of a decrease in load on the boiler, and a consequent increase in steam pressure, the valve 25 will be opened more, decreasing the danger of the water level in the boiler falling too low; and this is increased by the bleeding. As a consequence of these effects the water level may be carried higher or lower than ordinarily with less danger.

Fig. 4 illustrates a governor operated in part by a spring instead of a weight. The motor comprises the chambers 50 and 51 in the casing 52, and a sylphon bellows 53 separates the two chambers. In the upper chamber is a spring 54 which, pushing against the lower end of the bellows 55, tends at all times to open the valve 25 by means of the levers and the links indicated. Also, communicating with the chamber 50 is a pipe 60 which is connected with the steam main 16 of the boiler. Thus the steam pressure assists in opening the valve. Opposing the tendency of the spring and the steam pressure is the pressure of the water in the valve outlet which is effective through the pipe 61 connecting the pipe 19 and the pilot valve casing 62. This pressure is transmitted from this casing to the water chamber 51 of the motor casing by the pipe 63. Also connected to the pilot valve casing is the pipe 64 which leads directly or indirectly to the atmosphere. The action of the pilot valve is substantially the same as in case of Fig. 2.

The operation of this governor is similar to that of Fig. 2, except that the spring 54 takes the place of the weight 26. The compressive force of the spring, however, varies as it operates, while the effect of the weight remains substantially uniform. Hence the loss in pressure of the spring as the valve opens needs to be considered.

The loss in pressure of the spring is similar in its effects to the drop in pressure in the water pipe to the feed water valve as the valve 25 opens and the flow of water increases. Hence the water delivered by the water supplying means must be increased as the valve 25 opens, as the opening of the valve will be less than if the spring force were uniform. In Fig. 5 the curve 70 indicates the pressure loss due to the spring characteristic, together with the friction loss. By setting the ratio of the pilot valve movement to that of the main valve at .272 to 1 the curve 71 results, and this corresponds fairly closely to the curve 70, and thus for most purposes takes care of the spring pressure loss.

It will be understood that these various ratios of the valve movements may be obtained by adjusting the position of the link 38 with reference to the valve levers. Also the relative positions of the valves may be adjusted by means of the link 38, which is connected to the levers by right and left hand screws. While the pressure curves 41 and 71 are sufficiently close to the corresponding friction loss curves 40 and 70 for most purposes, yet the curves can be made to correspond by varying the shape of the pilot valve ports. An inspection of both of these pairs of curves show that the governor curves fail to raise the pressure as high as the pressure curves require, except at the minimum and maximum loads. By increasing the bleeding somewhat between these limiting loads, according to the difference between the curves, the pressure may be raised the desired amount.

If the pilot valve ports are formed somewhat as indicated in Fig. 6, this increase in pressure at intermediate loads will be provided for. It will be understood that the increased bleeding through the port 73, along the central portion of the load range will be effective until the maximum load is reached, and, hence, to make the curves correspond as the maximum load is approached, the port 73 should be narrower at the lower end than is required to produce the curve 41 or 71, the total area of the port 73 being equal to that of the port 43 of Fig. 3; and the port 72 is preferably somewhat narrower at the central portion.

Substantially the same result may be arrived at by varying the relative movements of the valves as the load changes, increasing the ratios as the load increases until the point is reached where the two curves begin to converge, and then decreasing the ratio until the maximum load is reached. These variations in the ratios can be arrived at automatically by any suitable means, such as cam means for shifting the link 38 longitudinally of the levers as the load changes.

Fig. 7 illustrates a modified boiler system embodying my invention, in which the generator feed water regulator 13 of Fig. 1 is replaced by an ordinary type of feed water regulator 80. Also the governor valve 25 is mounted in the steam pipe 82 from the steam main to the pump 83; and it is immaterial whether the weight or the spring motor means is used in this case as in the other. These modifications have no material effect on my invention as set forth in the claims herein.

Inserting the governor in the steam pipe of the pump, instead of in the water pipe, causes the pump to increase in speed with the demand for water, and with the bleed valve the speed is increased sufficiently to raise the discharge pressure the additional amount required. When the governor valve is in the water pipe the discharge of the water supplying means is at the outlet of the valve. In such a case any means may be used to operate the pump, but preferably it should deliver water at a uniform pressure to the governor valve 25.

It is also immaterial whether the boiler system has an economizer or a superheater or any other similar attachments. With any ordinary boiler system, by the use of the bleed valve operating on the governor, if it is suitably formed and adjusted, the water level in the boiler can be controlled as may be desired to meet any ordinary conditions. The level range may be as great as may be desired. Also the hazard of flooding or emptying the boiler is substantially eliminated. Also the flow of water is more uniform, as oscillations of the level with uniform loads are materially reduced or entirely eliminated. This is because to produce a given change in flow requires less change in the opening of the feed water valve and hence less change in the water level.

Although I have shown and described with considerable detail the preferred form of apparatus for carrying out my invention, yet it is to be understood that various modifications thereof may be made by those familiar with the art without departing from the spirit of my invention as disclosed by the following claims. For instance it is not necessary to have the governor motor operated by the steam pressure from the boiler, as the weight or spring may be increased in effectiveness, and the steam pressure dispensed with.

I claim as my invention:

1. In a boiler system, a feed water pipe and means for supplying water under pressure to said pipe, a valve for controlling the pressure of the water at the outlet of the means, said means being affected by the pressure of the water in the outlet, and means included in said supplying means for varying the effective pressure of said outlet water on said supplying means.

2. In a boiler system as claimed in claim 1, a pipe operatively connecting the steam main of the boiler with the supplying means, said pressure controlling valve being mounted in said last mentioned pipe.

3. In a boiler system as claimed in claim 1, said varying means being responsive to the movement of the pressure controlling valve.

4. In a boiler system as claimed in claim 1, said supplying means being responsive to the steam pressure of the system.

5. In a boiler system as claimed in claim 1, said varying means being responsive to the movement of the pressure controlling valve and being increasingly effective as the valve opens.

6. In a boiler system, a feed water pipe, and means for delivering water under pressure to the pipe, said means including a pump operatively connected to the pipe and a valve for controlling the pressure of the water delivered by said pump, a motor for operating the valve, a passageway operatively connecting the delivery chamber of said pump with the motor, and means for producing leakage in said passageway.

7. In a boiler system as claimed in claim 6, said leakage means being responsive to the movement of the valve.

8. In a boiler system as claimed in claim 6, said delivering means comprising a pipe operatively connected to the pump and the steam main of the boiler, said valve being mounted in the latter pipe.

9. In a boiler system, water supplying means, a valve for controlling the pressure of the water delivered to the boiler by the supplying means, a fluid operable motor for controlling the opening of the valve, a conduit for passing to the motor water delivered by said supplying means, and means for variably bleeding water from the conduit as the valve opening changes.

10. In a boiler system as claimed in claim 9, in which said bleeding means comprises a valve having an elongated port substantially parallel with the path of the last mentioned valve.

11. In a boiler system as claimed in claim 9, in which said bleeding means comprises a valve having a port with elongated sides the edges of which are non-parallel.

12. In a boiler system, a pump, a feed water pipe operatively connecting the pump with the boiler, a water level regulating valve mounted in the pipe, a pressure governor valve mounted in the pipe adjacent the pump, a motor for operating the latter valve, a conduit connecting the outlet of the latter valve with the motor, a conduit connecting the motor with a chamber of low fluid pressure, a valve in each conduit, and means responsive to the movement of the governing valve for operating said conduit valves.

13. A boiler system as claimed in claim 12, a pipe operatively connecting the motor with the steam main of the boiler, and mechanical yielding means tending to operate the governing valve.

14. A method of feeding water to a boiler system consisting in varying the opening of the feed water level regulating valve in accordance with varying thermal conditions of the boiler, and in varying the pressure of the water delivered to the valve by the water supplying means as the flow of water from the water supplying means varies and independently of the water pressure at said valve.

15. A method of feeding water to a boiler system as claimed in claim 14, and consisting in varying said pressure directly as the flow of water to the system varies.

16. A method of feeding water to a boiler system as claimed in claim 14, and consisting in varying the said pressure substantially as the square of the rate of flow varies.

17. A method of feeding water to a boiler system as claimed in claim 14, and consisting in varying the said pressure inversely as the flow of water to the boiler varies.

18. A method of varying the pressure of a fluid flowing from a valve the opening of which is responsive to changes in said fluid pressure, consisting in varying the effective pressure of said fluid on said valve by bleeding the fluid which affects said valve in response to changes in the opening of the valve.

19. A method of varying the pressure of a fluid flowing from a valve, the opening of which is responsive to changes on said fluid pressure, consisting in varying the effective pressure of the fluid on the valve in response to variations in the opening of the valve.

20. A method of varying the pressure of a fluid flowing from a valve, consisting in varying the opening of the valve in response to variations of said fluid pressure, and also consisting in varying the effective pressure of the fluid on the valve in response to variations in the opening of the valve.

VINCENT V. VEENSCHOTEN.